(12) United States Patent
Barson (10) Patent No.: US 8,718,282 B2
(45) Date of Patent: May 6, 2014

(54) APPARATUS AND METHOD FOR ENABLING A TRANSFER OF DATA

(75) Inventor: Andrew W Barson, Oldham (GB)

(73) Assignee: Money Controls Limited, Royton Oldham (GB)

( * ) Notice: Subject to any disclaimer, the term of this patent is extended or adjusted under 35 U.S.C. 154(b) by 1039 days.

(21) Appl. No.: 12/755,678

(22) Filed: Apr. 7, 2010

(65) Prior Publication Data

US 2010/0260339 A1 Oct. 14, 2010

(30) Foreign Application Priority Data

Apr. 9, 2009 (GB) .................................. 0906186.2

(51) Int. Cl.
*H04L 9/08* (2006.01)
(52) U.S. Cl.
USPC .......................................................... 380/283
(58) Field of Classification Search
USPC ............... 463/29; 380/251, 258, 278; 726/34
See application file for complete search history.

(56) References Cited

U.S. PATENT DOCUMENTS

| 5,710,813 A | 1/1998 | Terui et al. |
|---|---|---|
| 6,076,649 A * | 6/2000 | Waldorff, Jr. ................. 194/217 |
| 2001/0033222 A1 | 10/2001 | Nowottnick et al. |
| 2002/0120580 A1 | 8/2002 | Mayes |
| 2004/0256402 A1 | 12/2004 | Chirnomas |
| 2004/0257278 A1 | 12/2004 | Bye |
| 2005/0077995 A1 | 4/2005 | Paulsen et al. |
| 2007/0026797 A1 | 2/2007 | Borjeson et al. |
| 2007/0060302 A1* | 3/2007 | Fabbri ............................. 463/24 |
| 2007/0083604 A1 | 4/2007 | Zimman et al. |
| 2007/0155512 A1 | 7/2007 | Wells et al. |
| 2007/0188323 A1 | 8/2007 | Sinclair et al. |
| 2007/0213045 A1 | 9/2007 | Hermansson et al. |
| 2008/0091605 A1* | 4/2008 | Hughes et al. .................. 705/51 |
| 2008/0178282 A1 | 7/2008 | Yoffe et al. |
| 2008/0220880 A1* | 9/2008 | Barrie et al. ..................... 463/42 |
| 2010/0257896 A1* | 10/2010 | Zakutin .......................... 63/1.13 |

FOREIGN PATENT DOCUMENTS

| EP | 1 906 367 A1 | 4/2008 |
|---|---|---|
| EP | 1 398 982 B2 | 7/2010 |
| GB | 2172731 A | 9/1986 |
| WO | WO 2008/007175 A1 | 1/2008 |

OTHER PUBLICATIONS

Extended European Search Report with Written Opinion dated Jul. 6, 2010.
Intellectual Property Office Search Report for GB0906186.2, dated Jul. 30, 2009.
European Examination Report dated Oct. 19, 2011.

* cited by examiner

*Primary Examiner* — Brandon Hoffman
(74) *Attorney, Agent, or Firm* — Orrick Herrington & Sutcliffe, LLP (57) ABSTRACT

Secure data transfer apparatus comprising a first device to be mounted in a housing in a predetermined normal configuration for normal operation wherein secure data transfer takes place between the first device and a second device in the housing, the first device including a detector configured to detect when the first device is placed in a predetermined initialization configuration different from the normal configuration and to enable an initialization data transfer between the devices for permitting normal operation to occur thereafter in said normal configuration.

34 Claims, 5 Drawing Sheets

APPARATUS AND METHOD FOR ENABLING A TRANSFER OF DATA

RELATED APPLICATIONS

The present invention claims all rights of priority to Great Britain Patent Application No. GB 0906186.2, filed on Apr. 9, 2009, which is hereby incorporated by reference.

DESCRIPTION

The present invention relates to an apparatus for enabling a transfer of data between first and second devices. Particularly, but not exclusively, the invention relates to an apparatus for detecting an initialisation configuration of a first device and enabling a transfer of data between the first device and a second device in response to the initialisation configuration.

A secure transfer of data between two devices in a gaming or vending machine can be implemented using a symmetric key algorithm such as DES, Triple-DES or AES, in which an encryption key unique to a first of the devices is used by both devices to encrypt and decrypt data messages. However, the encryption key must be conveyed from the first device to the second device before encrypted communication between the devices can be initiated. Most commonly, the encryption key is unique to a peripheral device of the gaming or vending machine and must be inputted to the central processing unit of the machine when the peripheral device is first installed.

Conventionally the encryption key has been conveyed manually, for example by inputting the encryption key to the central processing unit via a keypad. Since encryption keys must be inputted for each peripheral device installed in the machine, and may also be re-inputted later in order to change the key for improved security, manual entry of encryption keys via a keypad is considered to be extremely time consuming and prone to human error. Furthermore, since encryption keys are often printed on the side of their peripheral devices to allow them to be read by an installer or service engineer, there is a possibility of the keys being obtained and used by fraudsters to instruct the machine to make an illegal payout.

An alternative to manual entry is to convey the encryption key using a serial connection between the peripheral device and the central processing unit. However, since the key would need to be transferred in an unencrypted or otherwise known form, this approach is also vulnerable to a fraudster obtaining the key during normal operation of the gaming or vending machine using an external device.

To prevent the key from being fraudulently obtained during normal operation of the gaming or vending machine, the peripheral device can be provided with a security switch on its external surface. The security switch can be flipped by a service engineer to briefly enable the transfer of the encryption key during installation of the device in the gaming or vending machine. Once the key has been transferred, the switch may be flipped-back to reactivate a default mode of the peripheral device and thereby prevent any further transfer of the encryption key. The service engineer may then lock a security door of the outer housing of the machine such that the security switch on the peripheral device is not readily accessible to a fraudster.

However, a problem with this type of external security switch is that, if a fraudster is able to breach the housing of the gaming or vending machine, for example by drilling a hole, he is able to easily flip the security switch on the peripheral device to enable the transfer of the encryption key and thereby perform a fraudulent act.

According to the invention, there is provided a secure data transfer apparatus comprising a first device to be mounted in a housing in a predetermined normal configuration for normal operation wherein secure data transfer takes place between the first device and a second device in the housing, the first device including a detector configured to detect when the first device is placed in a predetermined initialization configuration different from the normal configuration and to enable an initialization data transfer between the devices for permitting normal operation to occur thereafter in said normal configuration.

The detector may be configured to detect when the geometric orientation or angular position or acceleration of the first device fulfils a predetermined condition corresponding to the initialization configuration, and to enable the initialization data transfer in response to detecting that the geometric orientation or angular position or acceleration of the first device fulfils the predetermined condition.

The detector may be configured to detect when the first device is moved in a predetermined spatial or rotational pattern corresponding to the initialization configuration, and to enable the initialization data transfer in response to detecting that the first device has been moved in the predetermined spatial or rotational pattern.

The detector may be configured to detect when the first device is moved in a predetermined sequence of predetermined spatial or rotational patterns, said sequence corresponding to the initialization configuration, and to enable the initialization data transfer in response to detecting that the first device has been moved in said sequence.

The apparatus may be configured to enable the initialization data transfer in response to detecting that the geometric orientation of the first device is substantially 180 degrees to its normal operating orientation.

The apparatus may be configured to enable the transfer of data in response to detecting that the first device is upside down.

The detector may be provided in a removable unit which can be removed from the first device such that its geometric orientation, angular position or acceleration can be changed independently of the first device.

The detector may be configured to detect when the geometric orientation or angular position or acceleration of the removable unit fulfils a predetermined condition corresponding to the initialization configuration, and to enable the initialization data transfer in response to detecting that the geometric orientation or angular position or acceleration of the removable unit fulfils the predetermined condition.

The detector may be configured to detect when the removable unit is moved in a predetermined spatial or rotational pattern corresponding to the initialization configuration, and to enable the initialization data transfer in response to detecting that the removable unit has been moved in the predetermined spatial or rotational pattern.

The detector may be configured to detect when the removable unit is moved in a predetermined sequence of predetermined spatial or rotational patterns, said sequence corresponding to the initialization configuration, and to enable the initialization data transfer in response to detecting that the removable unit has been moved in said sequence.

The apparatus may be configured to enable the initialization data transfer in response to detecting that the geometric orientation of the removable unit is substantially 180 degrees to its normal operating orientation.

The apparatus may be configured to enable the transfer of data in response to detecting that the removable unit is upside down.

The apparatus may be configured to enable the initialization data transfer for a preset period and to switch to a default mode in which the initialization data transfer is not allowed when the preset period has elapsed.

The detector may comprise an orientation detector comprising an accelerometer.

The detector may comprise a micro electro-mechanical system (MEMS).

The initialisation data may comprise an encryption key for encrypted communication between the first and second devices.

The first device may comprise a memory configured to store whether or not the initialization data transfer is to be enabled, in response to a signal from the detector.

The apparatus may comprise a capacitive-reservoir configured to store electrical energy to power the first device.

In accordance with the invention, there may further be provided a gaming machine comprising the apparatus.

According to the invention, there is further provided a secure data transfer apparatus comprising a housing including first and second devices mounted therein in a predetermined normal configuration for normal operation wherein secure data transfer takes place between the devices, the first device being configured so that in response to being placed in a predetermined initialisation configuration different from the normal configuration an initialization data transfer is enabled between the devices to enable normal operation to occur thereafter in said normal configuration.

The housing may be so configured that it cannot readily be moved when the first device therein is in said normal operating condition to place the first device in said initialization condition.

The housing may comprise a secure enclosure containing the first and second devices, with a lockable opening to provide access to the first device, wherein the first device can be placed in the initialization condition by unlocking the opening to gain access to the first device and then moving the first device into said initialization condition.

The apparatus may have a fixing point to locate the first device in said normal configuration, wherein the first device is removable from the fixing point to be placed in the initialization condition.

The apparatus may comprise a gaming or vending machine.

According to the invention, there is further provided a method of enabling an initialization data transfer between a first device to be mounted in a housing in a predetermined normal configuration for normal operation and second device mounted in the housing, comprising detecting when the first device is in a predetermined initialisation configuration different from the normal configuration and enabling an initialization data transfer between the devices for permitting normal operation to occur thereafter in said normal configuration.

The method may comprise detecting when the geometric orientation or angular position or acceleration of the first device fulfils a predetermined condition corresponding to the initialization configuration and enabling the initialization data transfer in response to detecting the geometric orientation or angular position or acceleration of the first device fulfils the predetermined condition.

The method may comprise detecting when first device is moved in a predetermined spatial or rotational pattern corresponding to the initialization configuration, and enabling the initialization data transfer in response to detecting that the first device has been moved in the predetermined spatial or rotational pattern.

The method may comprise detecting when the first device is moved in a predetermined sequence of predetermined spatial or rotational patterns, said sequence corresponding to the initialization configuration, and enabling the initialization data transfer in response to detecting that the first device has been moved in said sequence.

The method may comprise enabling the initialization data transfer in response to detecting that the geometric orientation of the first device is 180 degrees to its normal operating orientation.

The method may comprise enabling the initialization data transfer in response to detecting that the first device is upside down.

The method may comprise detecting when the geometric orientation or angular position or acceleration of a removable unit removed from the first device fulfils a predetermined condition corresponding to the initialization configuration and enabling the initialization data transfer in response to detecting the geometric orientation or angular position or acceleration of the removable unit fulfils the predetermined condition.

The method may comprise detecting when removable unit is moved in a predetermined spatial or rotational pattern corresponding to the initialization configuration, and enabling the initialization data transfer in response to detecting that the removable unit has been moved in the predetermined spatial or rotational pattern.

The method may comprise detecting when the removable unit is moved in a predetermined sequence of predetermined spatial or rotational patterns, said sequence corresponding to the initialization configuration, and enabling the initialization data transfer in response to detecting that the removable unit has been moved in said sequence.

The method may comprise enabling the initialization data transfer for a preset period and switching to a default mode in which the transfer of data is not allowed when the preset period has elapsed.

The method may comprise storing whether or not the initialization data transfer is to be enabled, in response to the orientation of the first device.

Embodiments of the invention will now be described, by way of example, with reference to the accompanying figures in which.

Figure 1:
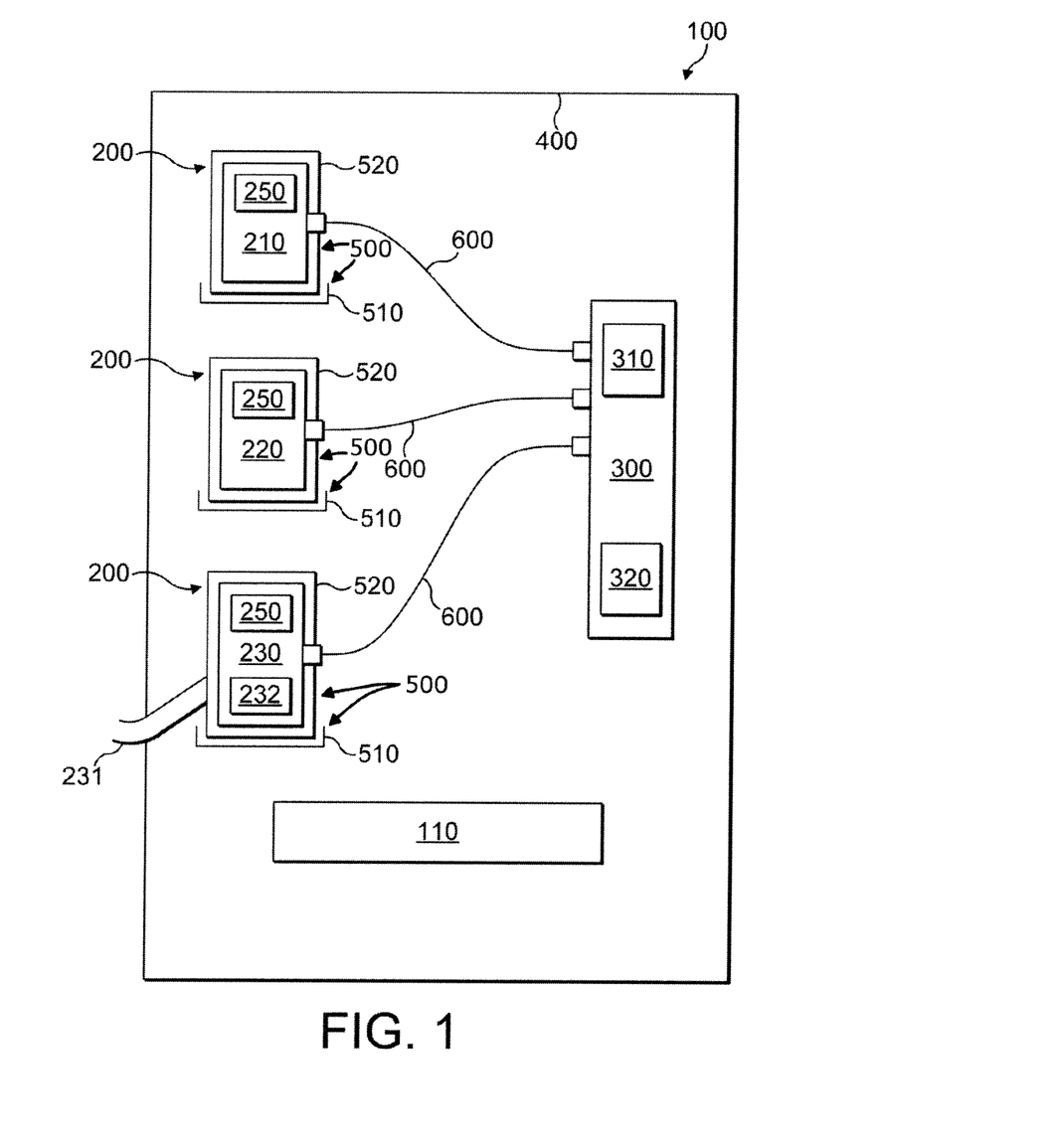
FIG. 1 is a schematic illustration showing the interior of a housing of a vending or gaming machine, comprising a peripheral device and a processing unit.

Referring to FIG. 1, an example gaming or vending machine 100 comprises a first device 200 and a second device 300. The machine 100 may comprise, for example a fruit machine or an arcade machine. Data may be transferred between the first device 200 and the second device 300, as is described in more detail below.

The first device 200 comprises a peripheral device 200 of the gaming or vending machine 100. For example, the peripheral device 200 may comprise a coin acceptor 210, a bill or bank note validator 220 or a hopper 230 configured to dispense coins or bills to a user through a hopper output 231. The second device 300 may comprise a micro-processing unit 300 of the gaming or vending machine 100, comprising a processor 310 and a memory 320. The peripheral device 200 and the micro-processing unit 300 may be housed in an outer housing 400 of the gaming or vending machine 100, which provides a secure enclosure such that the peripheral device 200 and micro-processing unit cannot be readily accessed from outside of the housing 400.

Figure 2:
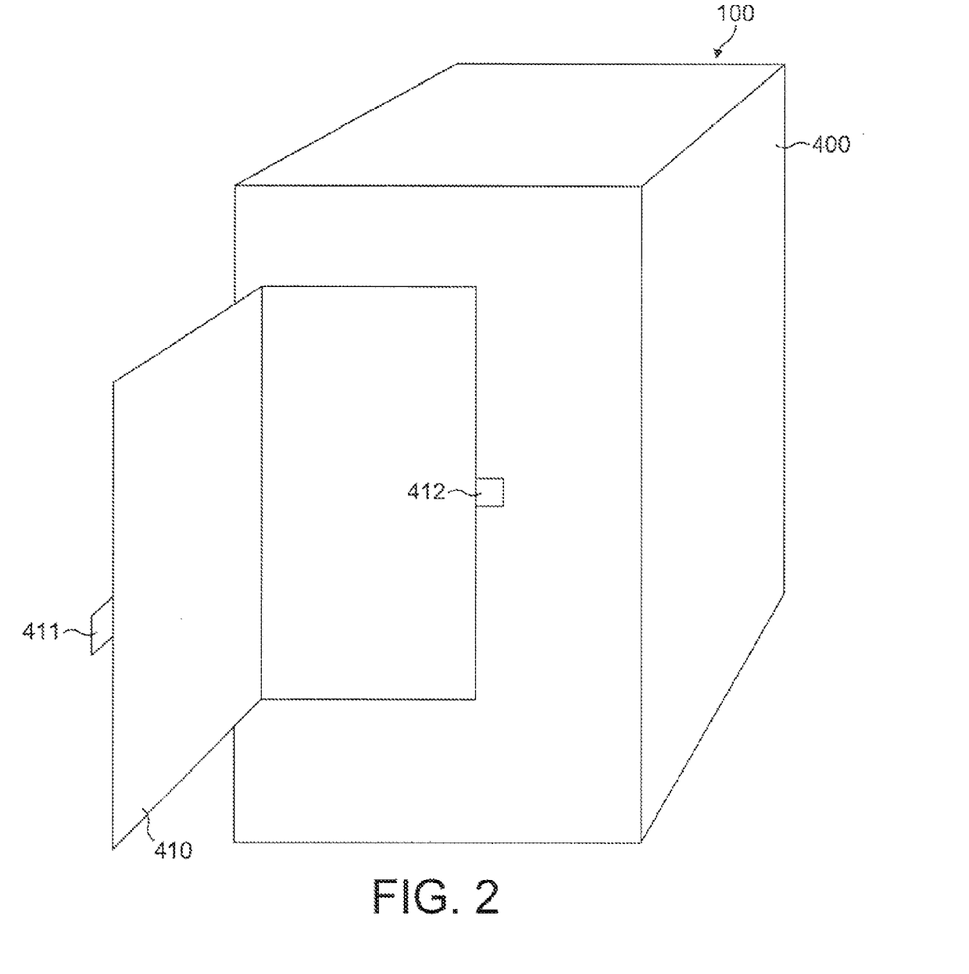
FIG. 2 is an illustration of a housing of a gaming or vending machine having a security door (shown in an open position) for allowing access to the interior of the housing.

Referring to FIG. 2, the housing 400 of the gaming or vending machine 100 may comprise an outer security door 410 located on a rear face of the housing 400 and provided with a suitable locking means 411 for cooperating with a corresponding locking means 412 on the housing 400. The security door 410 together with the locking means 411 prevent access to the interior of the housing 400 when the door 410 is closed and locked. Thus, when the security door 410 is closed and locked, the peripheral device 200 and micro-processing unit 300 are not accessible. The security door 410 can be opened by authorised personnel, such as service engineers, to gain access to the interior of the housing 400 and thus the peripheral device 200 and micro-processing unit 300.

The mass of the gaming or vending machine 100 may be several hundred kilograms, such that it cannot be readily moved by a person. Particularly, the mass of the gaming or vending machine 100 may be such that it cannot be readily rotated or turned upside down.

Referring back to FIG. 1, the housing 400 and/or the peripheral device 200 may comprise specific fixing points 500 for physically securing the peripheral device 200 inside the housing 400 of the gaming or vending machine 100. The peripheral device 200 may be mounted or secured in a predetermined normal configuration for normal operation in which a secure data transfer can take place between the peripheral device 200 and the micro-processing unit 300 as is explained in more detail below. The fixing points 500 may comprise one or more metal brackets 510 and/or a docking shelf 520 provided in the housing 400. The docking shelf 520 may, for example, comprise a box-shaped unit having an internal size substantially corresponding to the outer size of the peripheral device 200 such that the peripheral device 200 cannot be moved or rotated once installed in the gaming or vending machine 100. The fixing points 500 may be provided such that the peripheral device 200 can only be installed in the gaming or vending machine 100 in a single, specific geometric orientation or angular position. This specific geometric orientation/angular position will be referred to below as the normal operating orientation of the peripheral device 200, and may correspond to the predetermined normal configuration of the peripheral device 200.

The peripheral device 200 may be configured to transfer data to, and receive data from, the micro-processing unit 300 using suitable data transfer equipment. For example, as shown in FIG. 1, a flexible data cable 600 may couple the peripheral device 200 to the micro-processing unit 300 to provide a medium for transferring data between the peripheral device 200 and the micro-processing unit 300. Alternatively or additionally, the peripheral device 200 and the micro-processing unit 300 may be equipped with wireless data transfer means for transferring the data.

To enable secure data transfer with all external devices, including the micro-processing unit 300, the peripheral device 200 may be associated with a unique encryption key.

The encryption key can be used by the peripheral device 200 and the micro-processing unit 300 to encrypt and decrypt data messages transferred between them in the gaming or vending machine 100, thus providing a secure communication link. Since the encryption key is unique to the peripheral device 200, the key must be conveyed to the micro-processing unit 300 before secure data transfer can be initiated.

Figure 3:
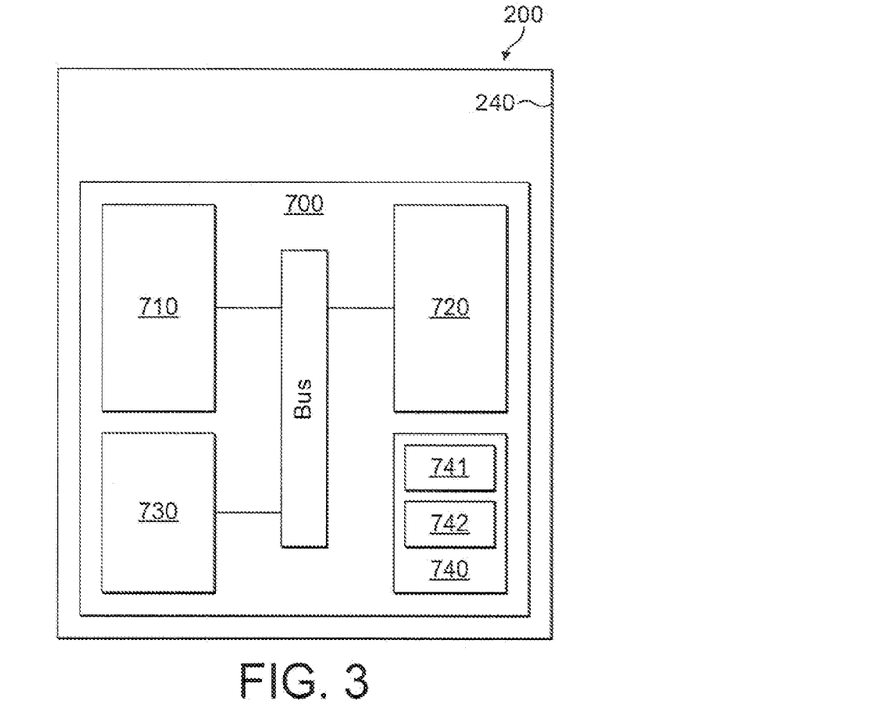
FIG. 3 is a schematic illustration of a peripheral device for use in a gaming or vending machine, comprising a control apparatus.

Referring to FIG. 3, the peripheral device 200 may comprise a control apparatus 700 comprised completely within an outer housing 240 of the peripheral device 200. The control apparatus 700 may be provided deep inside the housing 240, and may not have any electrical contacts at the external surface of the housing 240. As such, even if an unauthorised person is able to breach the housing 400 by drilling a small hole, there is no possibility of accessing the control apparatus 700 from outside of the housing 400.

The control apparatus may be configured to control the transfer of the encryption key between the peripheral device 200 and any other external device, such as the micro-processing unit 300 of the gaming or vending machine 100, based on the geometric orientation or angular position or acceleration of the peripheral device 200. The transfer of the encryption key may be referred to as an initialization data transfer. The initialization data transfer may be enabled in response to the geometric orientation, angular position or acceleration of the peripheral device 200 corresponding to a predetermined initialization configuration. Alternatively, the initialization data transfer may be enabled in response to the geometric orientation, angular position or acceleration of a removable unit, as is will be explained later.

The control apparatus 700 may be configured to operate in a default mode, in which a transfer of the encryption key between the peripheral device 200 and any other external device is prevented, unless specific geometric orientation, angular position or acceleration conditions corresponding to the predetermined initialization configuration have been fulfilled. The default mode may correspond to normal operation of the peripheral device 200.

It will be appreciated that, although the initialisation data transfer is described here with reference to the transfer of an encryption key in a gaming or vending machine 100, the control apparatus 700 is equally applicable to controlling the enablement of any type of data transfer.

Figure 4:
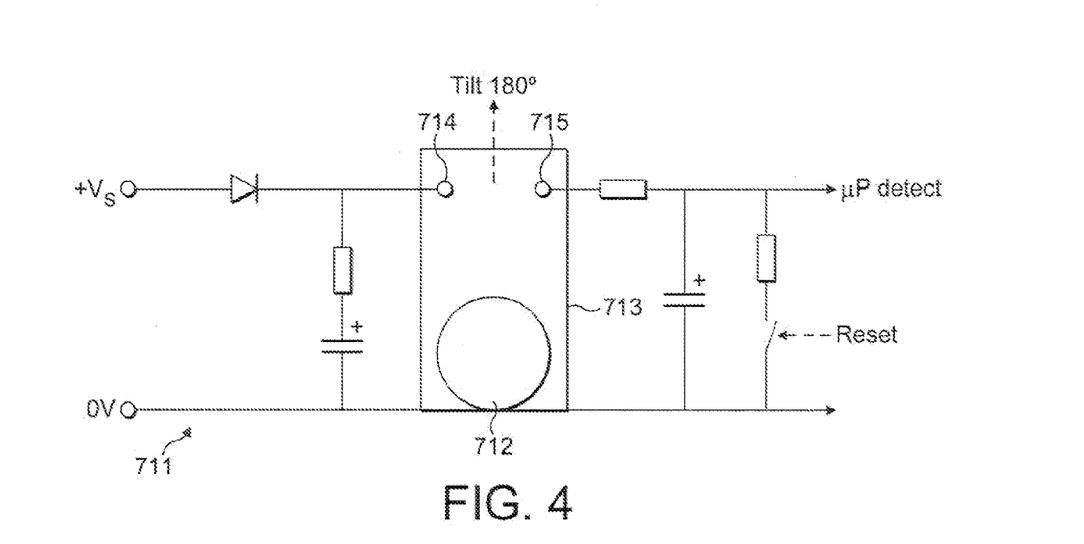
FIG. 4 is a circuit diagram of an example circuit for an orientation detector for use in the control apparatus.

The control apparatus 700 may comprise a detector 710 configured to detect the geometric orientation or angular position of the peripheral device 200. The detector 710 may comprise an orientation detector 710, and may additionally or alternatively be configured to detect the magnitude and direction of an acceleration of the peripheral device 200. The orientation detector 710 may comprise any suitable detector, such as an accelerometer, and may be implemented using a micro electro-mechanical system (MEMS) as is known in the art. Referring to FIG. 4, an example circuit 711 for detecting the orientation of the peripheral device 200 in the orientation detector 710 comprises an electrically conductive ball bearing 712 located in a cylindrical can 713. The can 713 may be fixed within the control apparatus 700 such that the ball bearing 712 is configured to move (e.g. under the force of gravity) within the can 713 in response to the geometric orientation, angular position or acceleration of the control apparatus 700 being changed. The ball bearing 712 may be configured to make an electrical contact across two contact points 714, 715 in the circuit 711 when the geometric orientation, angular position or acceleration of the peripheral device 200 fulfils the conditions for an allowable transfer of the encryption key to an external device. An electrical connection across the two contact points 714, 715 may cause a trigger signal to be generated to cause the control apparatus 700 to enable a transfer of the encryption key as is described in more detail below.

The control apparatus 700 may be configured to enable a transfer of the unique encryption key to an external device, such as the micro-processing unit 300, only in response to detecting that the geometric orientation or angular position and/or acceleration of the peripheral device 200 fulfils a predetermined condition. If the predetermined condition is not fulfilled, the control apparatus 700 may be configured to operate in a default mode in which a transfer of the encryption key to another device is not allowed. The predetermined condition may be that the peripheral device 200 is upside down with respect to its normal operating orientation. Alternatively or additionally, the predetermined condition may be that the geometric orientation or angular position of the peripheral device 200 is substantially at 180 degrees to its normal operating orientation. The predetermined condition may additionally or alternatively be that the peripheral device 200 has been moved in a predetermined spatial or rotational pattern or sequence, for example by detecting an acceleration of the peripheral device 200 using the orientation detector 710. The predetermined spatial or rotational pattern may comprise, for example, moving the peripheral device 200 laterally from left to right, then right to left, then left to right before allowing the device 200 to drop under the force of gravity for a distance of half a meter. The pattern may additionally include inverting the peripheral device 200 before the first movement from left to right. It will be appreciated that a large number of other patterns could alternatively be used for the predetermined condition, including a plurality of such patterns sequenced in time.

Alternatively, the peripheral device 200 may optionally be provided with a removable unit 250, such as a drawer, in which the control apparatus 700 or detector 710 is provided. The removable unit 250 may be removed from the peripheral device 200 and moved appropriately in order to place the peripheral device 200 in the initialisation configuration without having to change the geometric orientation, angular position or acceleration of the entire peripheral device 200. More specifically, the control apparatus 700 may be configured to enable a transfer of the unique encryption key to an external device, such as the micro-processing unit 300, in response to detecting that the geometric orientation or angular position and/or acceleration of the removable unit 250 fulfils a predetermined condition. If the predetermined condition is not fulfilled, the control apparatus 700 may be configured to operate in the default mode referred to above. The predetermined condition for the removable unit 250 may correspond to any of the conditions referred to above for the peripheral device 200.

In response to detecting that the geometric orientation, angular position and/or acceleration of the peripheral device 200 or removable unit 250 fulfils the conditions under which transfer of the encryption key is allowed, the control apparatus 700 may enable transfer of the encryption key to an external device such as the micro-processing unit 300.

An allowance period during which the transfer of the encryption data must be completed may be stored in a memory 720 of the control apparatus 700 to further restrict the availability of the encryption key to other devices. At the end of the allowance period, the control apparatus 700 may be configured to re-activate the default mode described above. The duration of the allowance period may be ten, twenty, thirty, forty, fifty or sixty seconds. The allowance period may be implemented using a timer 730 of the control apparatus 700, which may be configured to count-down the allowance period from the time at which the orientation detector 710 first detects that the conditions for allowable transfer of the encryption key have been fulfilled. For example, the orientation detector 710 may be configured to generate a trigger signal upon detecting that the conditions for allowable transfer of the encryption key have been fulfilled, which may be supplied to the timer 730 to activate a count-down of the allowance period. Alternatively, the control apparatus 700 may be configured to delay allowing the encryption key to be transferred to an external device until a later time as explained below.

For example, upon generation of the trigger signal from the orientation detector 710 indicating that the conditions for allowable transfer of the encryption key have been fulfilled, the control apparatus 700 may be configured to set a flag in its memory 720. Meanwhile, the control apparatus 700 may continue to operate in the default mode described above. The flag may be used to initiate the count-down of the allowance period at some later time, for example when the peripheral device 200 is connected to a main power supply circuit 110 of the gaming or vending machine 100 during the final stages of being installed in the machine 100. More specifically, upon detecting that the peripheral device 200 has been connected to the main power supply circuit 110 of the gaming or vending machine 100, the control apparatus 700 may be configured to check its memory 720 for the flag. If the flag is set, the control apparatus 700 may simultaneously allow the encryption key to be transferred to an external device and activate a count-down of the allowance period. Once the allowance period has elapsed, the control apparatus 700 may be configured to re-activate the default mode. The control apparatus 700 may also be configured to limit the number of successful transfers of the encryption key to one per allowance period.

The control apparatus 700 may optionally include an energy storage unit 740 for powering the control apparatus 700 before the peripheral device 200 has been permanently connected to the main power supply 110 of the gaming or vending machine 100. The energy storage unit 740 may be configured to supply power to the control apparatus 700 in order allow the control apparatus 700 to detect and store when the conditions for an allowable transfer of the encryption key to an external device have been fulfilled. The energy storage unit 740 may comprise a capacitive reservoir 741, which is configured to store energy supplied to the control apparatus 700 during a brief connection to the main power supply circuit 110 of the gaming or vending machine 100. This is described in more detail below. Alternatively or additionally, the energy storage unit 740 may comprise a chemical battery 742.

A transfer of the encryption key from the peripheral device 200 to the micro-processing unit 300 may take place serially, for example using the flexible data cable 600 described above. The flexible data cable 600 may be temporarily installed, and used to couple the peripheral device 200 to the micro-processing unit 300 for the purposes of transferring the encryption key only. Alternatively, the flexible data cable 600 may be permanently installed and additionally used for encrypted communication between the peripheral device 200 and the micro-processing unit 300 post installation of the peripheral device 200.

Once the encryption key for the peripheral device 200 has been successfully conveyed to the micro-processing unit 300, the micro-processing unit 300 may be configured to store the key in the memory 320 of the micro-processing unit 300 for future use. The peripheral device 200 may then use the encryption key to encrypt data messages before the messages are transferred to the micro-processing unit 300, and to decrypt data messages received from the micro-processing unit 300. The micro-processing unit 300 may use the encryption key to perform corresponding encryption and decryption of data messages with respect to the peripheral device 200.

Figure 5:
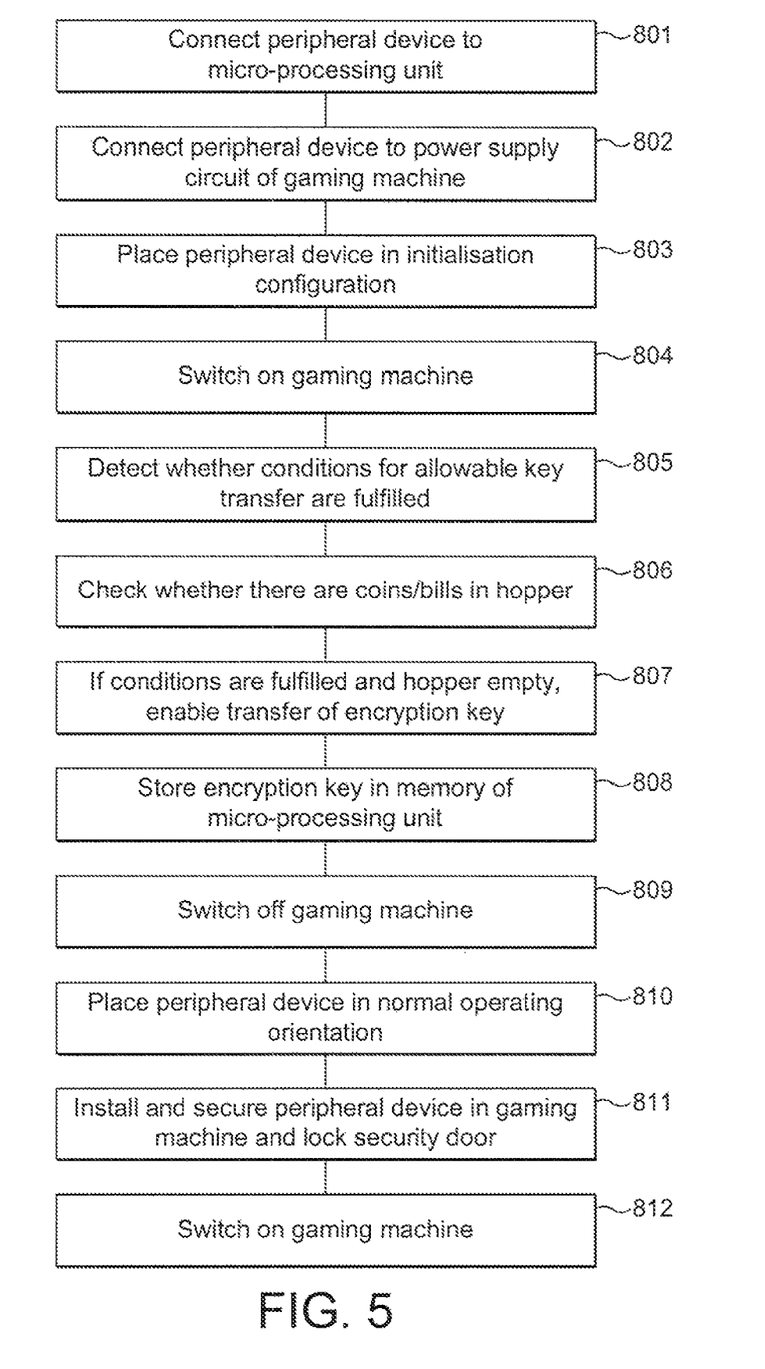
FIG. 5 is a flow diagram showing an example method for conveying an encryption key between a peripheral device and a micro-processing unit of a gaming or vending machine.

Referring to FIG. 5, an example method for transferring a unique encryption key from the peripheral device 200 to the micro-processing unit 300 is described below. The peripheral device 200 is initially both electrically and physically unconnected to the gaming or vending machine 100 in which it is to be installed. The gaming or vending machine 100 has its security door 410 unlocked and open, and may also be switched off or in a powered down state.

At a first step 801, the peripheral device 200 may be connected to the micro-processing unit 300 of the gaming or vending machine 100 using a flexible data cable 600 as described above. At a second step 802, the peripheral device 200 may also be connected to the main power supply circuit 110 of the gaming or vending machine 100, although power may not be supplied to the peripheral device 200 due to the gaming or vending machine 100 being switched off. At a third step 803, the geometric orientation, angular position or acceleration of the peripheral device 200 or removable unit 250 may be changed in a manner such that the conditions for allowable transfer of the encryption key are fulfilled. For example, the peripheral device 200 or removable unit 250 may be turned upside down with respect to its normal operating orientation. Additionally or alternatively, the geometric orientation or angular position of the peripheral device 200 or removable unit 250 may be changed so as to be at 180 degrees with respect to its normal operating orientation. Additionally or alternatively, the peripheral device 200 or removable unit 250 may be moved in a predetermined spatial or rotational pattern or sequence corresponding to that discussed above. All of these actions may be performed by a service engineer of the vending or gaming machine 100.

The first step 801, second step 802 and third step 803 may be performed in any order.

At a fourth step 804 the gaming or vending machine 100 may be switched on or powered up, such that power is supplied to both the micro-processing unit 300 and the peripheral device 200 through the main power supply circuit 110 of the gaming or vending machine 100. At a fifth step 805, the control apparatus 700 in the peripheral device 200 may detect whether the conditions for an allowable transfer of the encryption key are fulfilled.

At an optional sixth step 806, the control apparatus 700 or peripheral device 200 may perform an additional check of whether there are coins or bank notes in the hopper 230 of the gaming or vending machine 100. This may be achieved by communicating with a level sensor 232 fitted in the hopper 230, as shown in FIG. 1. The level sensor 232 is configured to detect the number of coins of bank notes in the hopper and return the information to the control apparatus 700. If there are coins or notes in the hopper 230, the transfer of the encryption key is prevented and the control apparatus 710 operates in the default mode. If there are no coins or bank notes in the hopper 230, and the conditions for an allowable transfer of the encryption key are fulfilled, at a seventh step 807 the control apparatus 700 may enable a transfer of the encryption key to the micro-processing unit 300. As described above, the transfer of the encryption key may be subject to the transfer being completed during an allowance period implemented by the control apparatus 700. If the encryption key is successfully transferred to the micro-processing unit 300, at an eighth step 808 the encryption key may be stored in the memory 320 of the micro-processing unit 300 for encrypting and decrypting data messages.

At an ninth step 809 the gaming or vending machine 100 may be switched off or powered down, and the data cable 600 may optionally be disconnected from the peripheral device 200 and/or micro-processing unit 300. At a tenth step 810, the peripheral device 200 may be returned to its normal operating orientation such that the conditions for allowable transfer of the encryption key are no longer fulfilled. At an eleventh step 811 the peripheral device 200 may be installed and secured in the gaming or vending machine 100 in its normal operating orientation using the fixing points 500 described above. The security door 410 may be locked closed using the locking means 411, such that the peripheral device 200 and micro-processing unit 300 cannot be accessed from outside the housing 400. At a twelfth step 812, the gaming or vending machine 100 may be switched on or powered up again with the peripheral device 200 installed in its normal operating orientation. Once the allowance period has elapsed, a further attempt by the micro-processing unit 300 or any other device (such as an external device used by a fraudster) to read the encryption key from the peripheral device 200 will fail due to the peripheral device 200 being configured to operate in the default mode described above.

Figure 6:
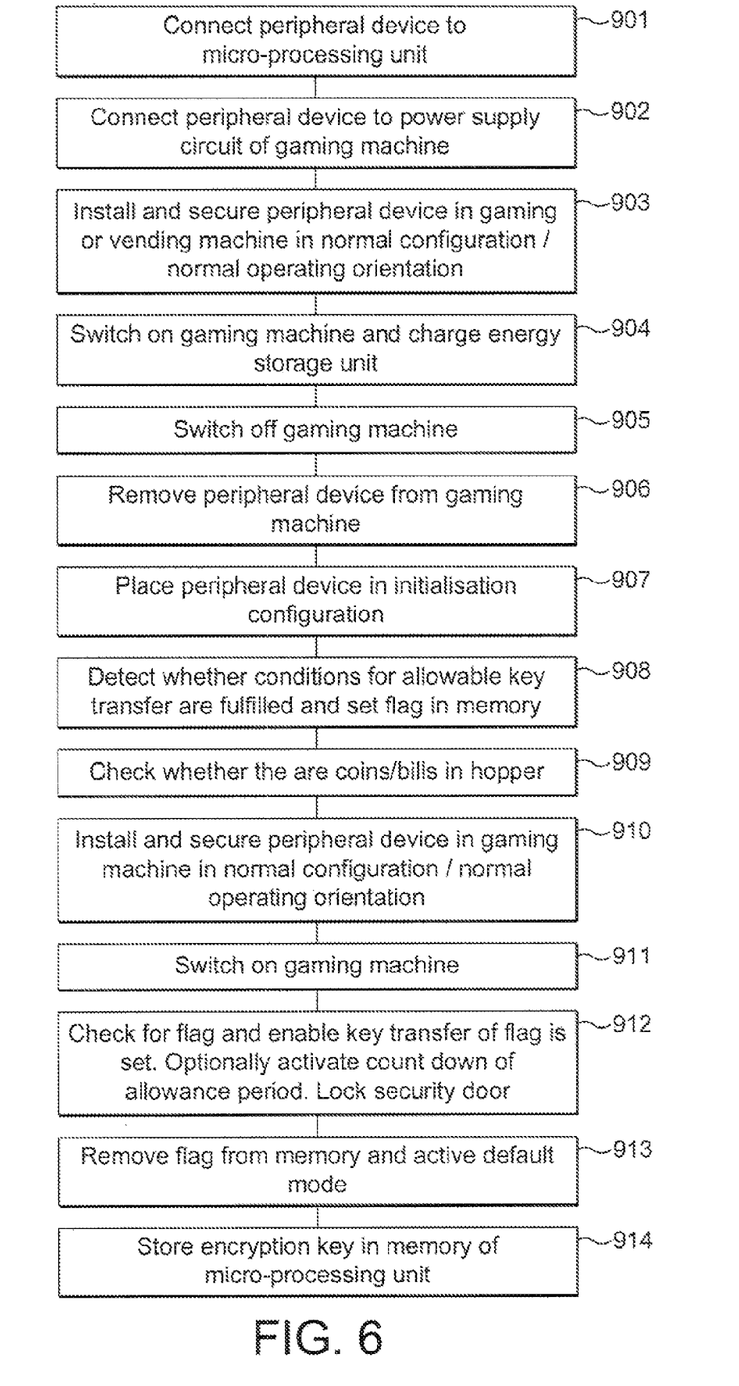
FIG. 6 is a flow diagram showing another example method for conveying an encryption key between a peripheral device and a micro-processing unit of a gaming or vending machine.

Referring to FIG. 6, another example method for transferring a unique encryption key from the peripheral device 200 to the micro-processing unit 300 is described below. The peripheral device 200 is initially both electrically and physically unconnected to the gaming or vending machine 100 in which it is to be installed. The gaming or vending machine 100 has its security door 410 unlocked and open, and is switched off or in a powered down state.

At a first step 901, the peripheral device 200 may be connected to the micro-processing unit 300 of the gaming or vending machine 100 using a flexible data cable 600 as described above. At a second step 902, the peripheral device 200 may also be connected to the main power supply circuit 110 of the gaming or vending machine 100, although power may not be supplied to the peripheral device 200 due to the gaming or vending machine 100 being powered down as described above. At a third step 903, the peripheral device 200 may be installed and secured in the gaming or vending machine 100 in its normal operating orientation using the fixing points 500 described above. At a fourth step 904, the gaming or vending machine 100 may be switched on or powered up with the peripheral device 200 installed in its normal operating orientation, such that power is supplied to both the micro-processing unit 300 and the peripheral device 200 through the main power supply circuit 110 of the gaming or vending machine 100. The duration for which the machine 100 is switched on may be sufficient for the power supply to the peripheral device 200 to provide a full electrical charge to the energy storage unit 740 in the control apparatus 700. For example, the amount of power supplied to the peripheral device 200 may be sufficient to provide a full electrical charge to the capacitive reservoir 741 and/or battery 742.

At a fifth step 905, the gaming or vending machine 100 may be switched off or powered-down. At a sixth step 906, the peripheral device 200 may be removed from the gaming or vending machine 100 such that it is able to freely move and rotate with respect to the housing 400 of the machine 100. Alternatively, the removable unit 250 may be removed from the peripheral device 200 such that it is able to freely move and rotate with respect to the housing 400 of the machine 100. At a seventh step 907, the geometric orientation, angular position or acceleration of the peripheral device 200 or removable unit 250 may be changed in a manner such that the conditions for allowable transfer of the encryption key are fulfilled. For example, the peripheral device 200 or removable unit may be turned upside down with respect to its normal operating orientation. Additionally or alternatively, the geometric orientation or angular position of the peripheral device 200 or removable unit 250 may be changed so as to be at 180 degrees to the normal operating orientation. Additionally or alternatively, the peripheral device 200 or removable unit may be moved in a predetermined spatial or rotational pattern or sequence as previously discussed.

At an eighth step 908 the control apparatus 700 may detect that the conditions for allowable transfer of the encryption key have been fulfilled, despite the gaming or vending machine 100 being switched off or powered down such that no power is supplied by the main power supply circuit 110. This is made possible by power supplied in the control apparatus 700 by the energy storage unit 740, which is sufficient to both detect that the conditions have been fulfilled and to set a flag in the memory 720 as described above.

At an optional ninth step 909, the control apparatus 700 may perform an additional check of whether there are coins or bank notes in the hopper 230 of the gaming or vending machine 100 by communicating with the level sensor 232. If there are coins or notes in the hopper 230, the transfer of the encryption key is prevented and the control apparatus 710 operates in the default mode. If there are no coins or bank notes in the hopper 230, and the conditions for an allowable transfer of the encryption key are fulfilled, the control apparatus 700 may enable a transfer of the encryption key to the micro-processing unit 300 upon power being supplied from the main power supply circuit 110 of the machine 100 as described below.

At a tenth step 910, the peripheral device 200 may be re-installed and re-secured in the gaming or vending machine 100 in its normal operating orientation using the fixing points 500 described above. At an eleventh step 911, the gaming or vending machine 100 may be switched on or powered up again such that power is supplied to both the micro-processing unit 300 and the peripheral device 200 via the main power supply circuit 110 of the machine 100. At a twelfth step 912, the control apparatus 700 may check its memory 720 for the flag discussed above. If the flag is set, the control apparatus 700 may be configured to allow a transfer of the encryption key to the micro-processing unit 300. For example, the control apparatus 700 may be configured to activate a countdown of the allowance period at the timer 730 and allow a transfer of the encryption key to the micro-processing unit 300 during the allowance period. The security door 410 may be locked closed at this stage using the locking means 411, such that the peripheral device 200 and micro-processing unit 300 cannot be accessed from outside the housing 400. At a thirteenth step 913, once the allowance period has elapsed, the control apparatus 700 may be configured to remove the flag in the memory 720 and activate its default mode in which transfer of the encryption key is not allowed. The control apparatus 700 may be configured to allow only one transfer of the encryption key during the allowance period.

If the encryption key is successfully transferred to the micro-processing unit 300, at a fourteenth step 914 the encryption key may be stored in the memory 320 of the micro-processing unit 300 for encrypting and decrypting data messages. Once the allowance period has elapsed, a further attempt by the micro-processing unit 300 or any other device (such as an external device used by a fraudster) to read the encryption key from the peripheral device 200 will fail due to the peripheral device 200 being configured to operate in the default mode for normal operation.

Although the invention has been described with respect to a single peripheral device 200, it will be appreciated that the gaming or vending machine 100 may equally comprise a plurality of peripheral devices 200 each having its own unique encryption key. This is shown in FIG. 1. Any of the aspects of the above described embodiments and alternatives may used in combination with any other aspect of the above described embodiments or alternatives to achieve the effects of the invention.

The invention claimed is:

1. A secure data transfer apparatus comprising a first device to be mounted in a housing for a gaming or vending apparatus in a predetermined normal geometric orientation for normal operation, wherein whilst mounted in the normal geometric orientation the first device is configured to perform normal operations comprising secure data transfer between the first device and a second device in the housing, wherein the first device includes a detector which, when the first device is not mounted in the housing, is configured to detect when the first device is placed in a predetermined initialization configuration different from the normal orientation by detecting when at least one of a geometric orientation, angular position, or acceleration of the first device fulfills a predetermined condition which corresponds to the initialization configuration;

wherein the first device is configured to enable an orientation, angular position, or acceleration-triggered initialization data transfer between the first device and the second device in response to detecting that the first device has been placed in the initialization configuration; and wherein the first device is configured thereafter to operate normally when secured in the housing in the normal orientation by participating in secure data transfer between the first device and the second device and the second device using the initialization data transferred in the orientation, angular position, or acceleration-triggered initialization data transfer.

2. The apparatus according to claim 1, wherein the detector is configured to detect when the first device is moved in a predetermined spatial or rotational pattern corresponding to the initialization configuration, and to enable the initialization data transfer in response to detecting that the first device has been moved in the predetermined spatial or rotational pattern.

3. The apparatus according to claim 1, wherein the detector is configured to detect when the first device is moved in a predetermined sequence of predetermined spatial or rotational patterns, said sequence corresponding to the initialization configuration, and to enable the initialization data transfer in response to detecting that the first device has been moved in said sequence.

4. The apparatus according to claim 1, configured to enable the initialization data transfer in response to detecting that the geometric orientation of the first device is substantially 180 degrees to its normal operating orientation.

5. The apparatus according to claim 1, configured to enable the transfer of data in response to detecting that the first device is upside down.

6. The apparatus according to claim 1, wherein the detector is provided in a removable unit which can be removed from the first device such that its geometric orientation, angular position or acceleration can be changed independently of the first device.

7. The apparatus according to claim 6, wherein the detector is configured to detect when the geometric orientation or angular position or acceleration of the removable unit fulfils a predetermined condition corresponding to the initialization configuration, and to enable the initialization data transfer in response to detecting that the geometric orientation or angular position or acceleration of the removable unit fulfils the predetermined condition.

8. The apparatus according to claim 6, wherein the detector is configured to detect when the removable unit is moved in predetermined spatial or rotational pattern corresponding to the initialization configuration, and to enable the initialization data transfer in response to detecting that the removable unit has been moved in the predetermined spatial or rotational pattern.

9. The apparatus according to claim 6, wherein the detector is configured to detect when the removable unit is moved in a predetermined sequence of predetermined spatial or rotational patterns, said sequence corresponding to the initialization configuration, and to enable the initialization data transfer in response to detecting that the removable unit has been moved in said sequence.

10. The apparatus according to claim 6, configured to enable the initialization data transfer in response to detecting that the geometric orientation of the removable unit is substantially 180 degrees to its normal operating orientation.

11. The apparatus according to claim 6, configured to enable the transfer of data in response to detecting that the removable unit is upside down.

12. The apparatus according to claim 1, wherein the apparatus is configured to enable the initialization data transfer for a preset period and to switch to a default mode in which the initialization data transfer is not allowed when the preset period has elapsed.

13. The apparatus according to claim 1, wherein the detector comprises an orientation detector comprising an accelerometer.

14. The apparatus according to claim 1, wherein the detector comprises a micro electro-mechanical system (MEMS).

15. The apparatus according to claim 1, wherein the initialisation data comprises an encryption key for encrypted communication between the first and second devices.

16. The apparatus according to claim 1 wherein the first device comprises a memory configured to store whether or not the initialization data transfer is to be enabled, in response to a signal from the detector.

17. The apparatus according to claim 1, wherein the apparatus comprises a capacitive reservoir configured to store electrical energy to power the first device.

18. A gaming machine comprising the apparatus according to claim 1.

19. A secure data transfer apparatus comprising a housing for a gaming or vending apparatus including first and second devices mounted therein in a predetermined normal geometric orientation for normal operation, wherein whilst mounted in the normal geometric orientation the first device is configured to perform normal operations comprising secure data transfer between the first device and the second device in the housing,
wherein the first device includes a detector which, when the first device is not mounted in the housing, is configured to detect when the first device is placed in a predetermined initialization configuration different from the normal orientation by detecting when at least one of a geometric orientation, angular position, or acceleration of the first device fulfills a predetermined condition which corresponds to the initialization configuration;
wherein the first device is configured to enable an orientation, angular position, or acceleration-triggered initialization data transfer between the first device and the second device in response to detecting that the first device has been placed in the initialization configuration; and
wherein the first device is configured thereafter to operate normally when secured in the housing in the normal orientation by participating in secure data transfer between the first device and the second device using the initialization data transferred in the orientation, angular position, or acceleration-triggered initialization data transfer.

20. The apparatus according to claim 19 wherein the housing is so configured that it cannot readily be moved when the first device is secured in the housing in the normal operating orientation to place the first device in said initialization configuration.

21. The apparatus according to claim 19 wherein the housing comprises a secure enclosure containing the first and second devices, with a lockable opening to provide access to the first device, wherein the first device can be placed in the initialization configuration by unlocking the opening to gain access to the first device and then moving the first device into said initialization configuration.

22. The apparatus according to claim 19 wherein the housing comprises a fixing point to locate the first device in said normal orientation, wherein the first device is removable from the fixing point to be placed in the initialization configuration.

23. The apparatus according to claim 19, comprising a gaming or vending machine.

24. A method of enabling an initialization data transfer between a first device to be mounted in a housing for a gaming or vending apparatus in a predetermined normal geometric orientation in which the first device is configured to perform normal operations comprising secure data transfer with a second device mounted in the housing, comprising:
detecting when the first device is in a predetermined initialization configuration different from the normal configuration by detecting when at least one of a geometric orientation, angular position, or acceleration of the first device fulfills a predetermined condition which corresponds to the initialization configuration;
enabling an orientation, angular position, or acceleration-triggered initialization data transfer between the first device and the second device in response to detecting that the first device has been placed in the initialization configuration; and
using the initialization data transferred in the orientation, angular position, or acceleration-triggered initialization data transfer in secure data transfer between the first device and the second device when the first device is secured in the housing in the normal orientation.

25. The method according to claim 24, comprising detecting when the first device is moved in predetermined spatial or rotational pattern corresponding to the initialization configuration, and enabling the initialization data transfer in response to detecting that the first device has been moved in the predetermined spatial or rotational pattern.

26. The method according to claim 24, comprising detecting when the first device is moved in a predetermined sequence of predetermined spatial or rotational patterns, said sequence corresponding to the initialization configuration, and enabling the initialization data transfer in response to detecting that the first device has been moved in said sequence.

27. The method according to claim 24, comprising enabling the initialization data transfer in response to detecting that the geometric orientation of the first device is 180 degrees to its normal operating orientation.

28. The method according to claim 24, comprising enabling the initialization data transfer in response to detecting that the first device is upside down.

29. The method according to claim 24 comprising detecting when the geometric orientation or angular position or acceleration of a removable unit removed from the first device fulfils a predetermined condition corresponding to the initialization configuration and enabling the initialization data transfer in response to detecting the geometric orientation or angular position or acceleration of the removable unit fulfils the predetermined condition.

30. The method according to claim 29, comprising detecting when the removable unit is moved in a predetermined spatial or rotational pattern corresponding to the initialization configuration, and enabling the initialization data transfer in response to detecting that the removable unit has been moved in the predetermined spatial or rotational pattern.

31. The method according to claim 29, comprising detecting when the removable unit is moved in a predetermined sequence of predetermined spatial or rotational patterns, said sequence corresponding to the initialization configuration, and enabling the initialization data transfer in response to detecting that the removable unit has been moved in said sequence.

32. The method according to claim 24, comprising enabling the initialization data transfer for a preset period and switching to a default mode in which the transfer of data is not allowed when the preset period has elapsed.

33. The method according to claim 24, wherein the initialization data comprises an encryption key for encrypted communication between the first and second devices.

34. The method according to claim 24, comprising storing whether or not the initialization data transfer is to be enabled, in response to the orientation of the first device.

* * * * *